United States Patent [19]

Weinhold

[11] 4,417,703

[45] Nov. 29, 1983

[54] QUICK RETRIEVE CORD REEL

[76] Inventor: Dennis G. Weinhold, P.O. Box 462, Chapman, Ariz. 67431

[21] Appl. No.: 322,923

[22] Filed: Nov. 19, 1981

[51] Int. Cl.³ .............................................. B65H 75/48
[52] U.S. Cl. .................................................. 242/107.12
[58] Field of Search ........... 242/107.1, 107.11, 107.12, 242/107.13, 107.14, 107.15, 100.1, 107

[56] References Cited

U.S. PATENT DOCUMENTS 452,799   5/1891  Matteson ......................... 242/107.11
2,514,628 7/1950  Cortes ............................ 242/107.1 X
3,809,331 5/1974  Gaul .............................. 242/100.1

FOREIGN PATENT DOCUMENTS 677778  8/1952  United Kingdom ........... 242/107.12

*Primary Examiner*—John M. Jillions
*Attorney, Agent, or Firm*—Harry M. Weiss; Charles P. Padgett, Jr.

[57] ABSTRACT

A mobile cord reel which incorporates a rotatably mounted axle having the cord passing diagonally diametrically therethrough, to serve as a device to permit quick spooling of a cord from two directions into a reel located in the midst of the cord.

6 Claims, 6 Drawing Figures

QUICK RETRIEVE CORD REEL

BACKGROUND OF THE INVENTION

1. Field of the Invention

This invention relates to storage devices, and, more specifically, to a cord storage device which is compact, offers a quick retrieve, and which can be floated to any location along an unreeled cord.

2. Description of the Prior Art

In the past, cords have been used in a wide variety of applications. Such cords included electrical cords, air hoses, water hoses, safety lines, and others. Since the cords were relatively light-weight, they were commonly used to provide mobility for the connected devices. Cords also presented a management problem, in that a tangle of the loose length of cord typically ensued whenever the cord was less than fully extended. The tangle of loose cord was always an inconvenience, and was often a safety problem. While it was possible to manually coil the cord into loops, the manual coiling operation was slow and also inconvenient.

To deal with the problems resulting from loose cord lying about, cord reels were developed. In the past, such cord reel devices typically used a rotary spool or drum to store the cord. By pulling onto the ends, the cord could be unwound from the reel as the spool rotated. A drive mechanism was connected to the spool, allowing the cord to be reeled back onto the spool when desired. The drive mechanism was often an anchored spring attached to the spool. Manual or power drives were also employed.

However, conventional cord reels retained several problems. With a drum-type reel, and with a cord of the type used to convey matter or energy, it was necessary to employ a rotary connection in the flow path. The rotary connection fed the matter or energy into the centrally located, rotating spool. Typical examples of such connections included slip ring assemblies for conducting electricity and universal-joint pipe connections for conveying water or air. The rotary connection was expensive, and being a mechanical device, required maintenance. A need existed for a cord reel which did not require a rotary connection to conduct matter or energy through the cord and through the reel.

SUMMARY OF THE INVENTION

In accordance with one embodiment of this invention, it is an object to provide a compact, quick-retrieve cord reel.

It is an object to provide a cord reel which can store two wraps of cord for every revolution of the reel axle.

It is a further object to provide a floating cord reel which can be repositioned along the length of a cord.

It is another object to provide a cord reel arranged to be mounted in the middle of a cord.

It is an object to provide a cord reel which can store a fluid or energy conducting cord without requiring a rotary connection in the flow path.

It is again another object to provide a cord reel which is mounted centrally upon a cord and which has guides to maintain the adjacent portions of the cord substantially perpendicular to the axle of the cord reel.

DESCRIPTION OF THE PREFERRED EMBODIMENTS

In accordance with one embodiment of this invention, there is provided a self-storing cord device, comprising a first cord; a second cord; axle means provided with an axle for releasably spooling the first and second cords about the axle; the first and second cords respectively having communication with axially spaced regions of the axle; and housing means for maintaining the axle in substantial perpendicularity to the first and second cords as the cords play from the axle so that a wrap of each of the first and second cords spools with each revolution of the axle.

In accordance with another embodiment of this invention, there is provided a floating cord reel comprising an axle defining an aperture lying generally in a diametrical plane of the axle so that the cord can be slit through the axle; housing means having the axle rotatably mounted therein for maintaining the cord in general perpendicularity with respect to the axle as the cord approaches the axle; and rotating means for selectively rotating the axle to spool the cord thereabout and further for permitting the cord to be selectively unspooled from the axle.

In accordance with yet another embodiment of this invention, there is provided a method of compactly storing cord in a floating reel, comprising the step of diametrically passing the cord through a axle of the reel so that the axle and the reel can travel upon the cord when the cord is fully extended.

While the invention has been particularly described and shown in reference to the preferred embodiments thereof, it will be understood by those skilled in the art that various changes in form and detail and omissions may be made therein without departing from the spirit and scope of the invention.

THE SPECIFICATION

Figure 1:
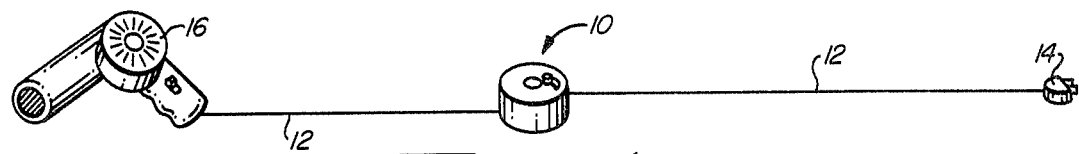
FIG. 1 is a perspective view of the reel mounted in the cord of a conventional appliance.

In FIG. 1, a perspective elevational view of a quick-retrieve cord reel 10 is shown. The reel 10 is installed upon a cord 12. The cord 12 is shown as a typical electrical cord, connecting a conventional plug 14 to an appliance 16. In the appropriate case, the cord 12 could also be an air hose, or other elongated member. The reel 10 is centrally located upon the cord 12, to permit the region of the cord 12 lying on either side of the reel 10 to be spooled into the reel 10, as subsequently described.

Figure 2:
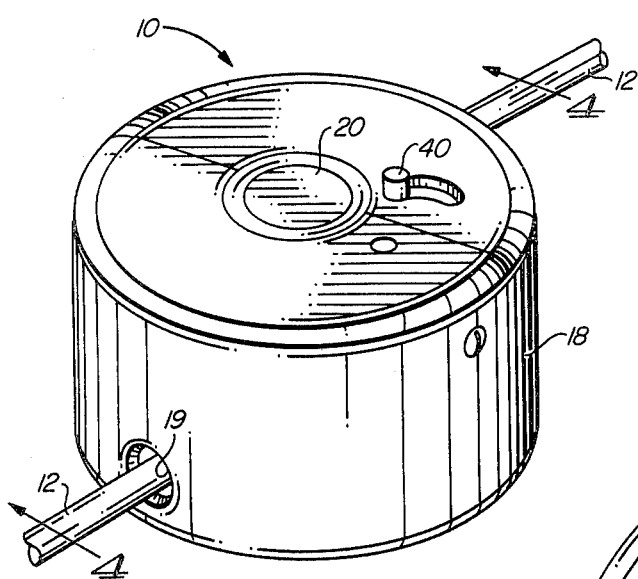
FIG. 2 is an enlarged perspective view of the reel.

Referring to FIG. 2, an enlarged perspective view of the reel 10 is shown. A housing 18 forms the outer shell of the device. The housing 18 rotatably mounts an axle 20. The cord 12 enters the housing 18 through housing openings, as typically shown by reference number 19. The cord 12 is stored about the axle 20, as shown more fully in FIGS. 4 and 6. A release knob 40 is pivotally coupled to the housing 18.

Figure 3:
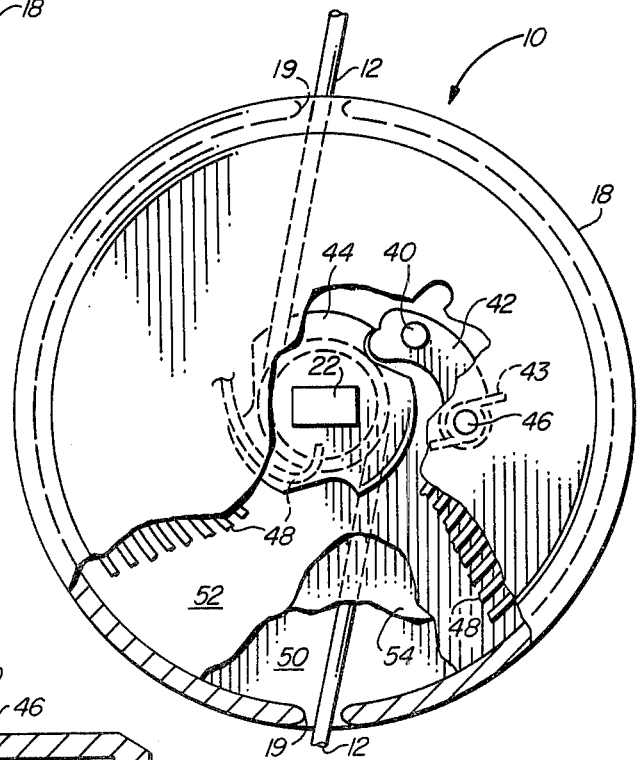
FIG. 3 is a partially sectioned end view of the reel.

FIG. 3 is a partially sectioned end view of the reel 10. As shown in FIG. 3, the release knob 40 is connected to a pawl 42. The pawl 42 is loaded by a pawl spring 43 into teeth of a ratchet wheel 44. The pawl 42 is attached to the housing 18 by a pivot pin 46. The ratchet wheel 44 is mounted upon a lug 22 portion of the axle 20.

The engagement of the pawl 42 against the teeth of the ratchet wheel 44 limits the axle 20 to a unidirectional rotation, until the release knob 40 is manually shifted to disengage the pawl 42 from the wheel 44.

A spring 48 engages the axle 20, and is also anchored to the housing 18. The spring 48 is a wound, leaf-typing spring. When compressed, the spring 48 tends to rotate the axle 20 to spool the cord 12. As the cord 12 is withdrawn from the reel 10, the spring 48 is compressed, but the pawl 42 sequentially engages the teeth of the ratchet wheel 44 to prevent a retraction of the cord 12 when the axial force is removed from the cord 12.

Figure 4:
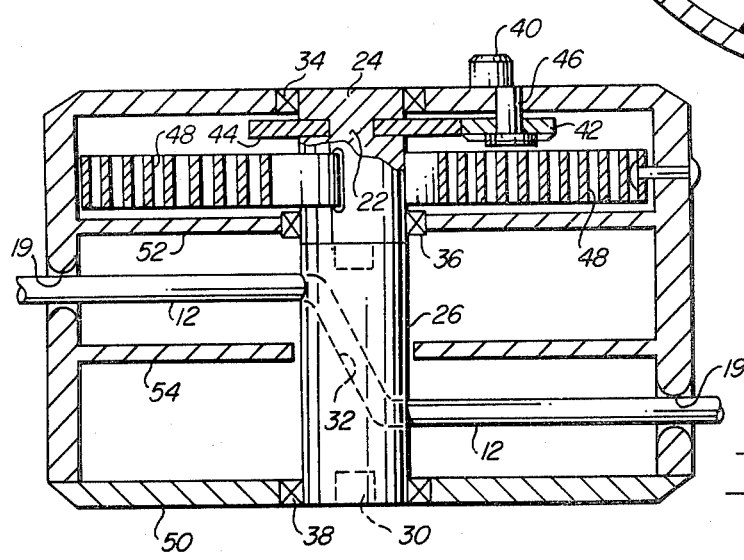
FIG. 4 is a sectional view taken along line 4—4 of FIG. 2.

Referring then to FIG. 4, a sectional view taken along line 4—4 of FIG. 2 is shown. An endplate 50 forms one side of the housing 18, and is attached to the remainder of the housing 18 by conventional fasteners. The axle 20 includes a spindle 24, which engages the spring 48. The axle 20 also includes first and second bobbin sections, as illustrated respectively by reference numbers 26 and 28. The bobbin sections 26, 28 jointly form a socket, which drivably engages the spindle 24. At the opposite end, the bobbins 26, 28 form a socket 30, which allows an external mechanical drive to be applied to the axle 20.

In concert, the bobbin sections 26, 28 of the axle 20 also define a passage 32, which permits the cord 12 to pass through the axle 20. The bobbin sections 26, 28 can be attached to one another with a thread fastener. The passage 32 lies in a diametrical plane. Thus, the axle 20, and the reel 10, can be centrally located upon a cord 12. When the cord 12 is fully unwound, the axle 20 and reel 10 are free to travel along the cord 12. When the axle 20 rotates, the cord 12 thus spools about two locations, and two wraps of the cord 12 are collected, or released, for every revolution of the axle 20. The passage 32 lies in a generally diagonal orientation within the axle 20, so that the cord 12 respectively enters and exits the axle 20 at spaced-apart regions. As more clearly illustrated in FIGS. 5 and 6, the passage 32 has smooth contours to permit free passage of the cord 12 as the reel 10 is moved along the cord 12. The spindle 24 is supported by bearings 34, 36, and the portion of the axle 20 formed by the bobbins 26, 28 is supported by a third bearing 38 and the drive-engagement to the spindle 24.

When the endplate 50 is removed, the cord 12 can be threaded through the passage 32, and the bobbin-portion of the axle 20 can be totally removed from the reel 10. Baffles 52, 54 form a part of the housing 18, and respectively maintain the two lengths of the spooled cord 12 in separate chambers. The baffles 52, 54 prevent the cord 12 from becoming entangled with either the spring 48 or the length cord in the adjacent chamber.

Figure 5:
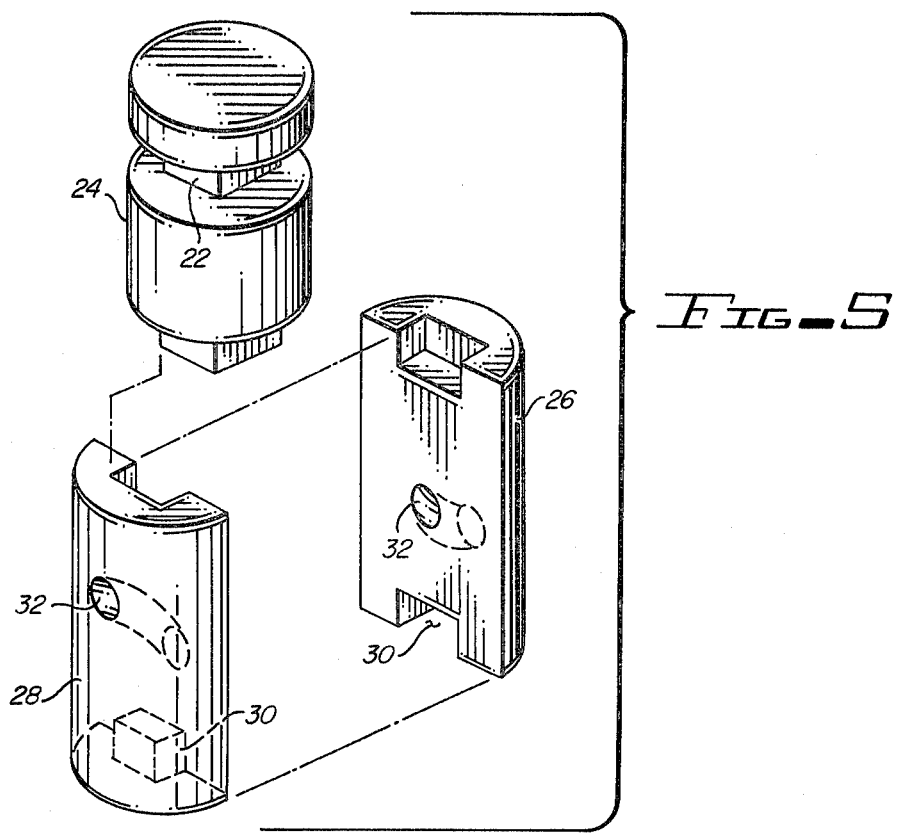
FIG. 5 is an enlarged perspective view of the axle of the reel in isolation.

FIG. 5 is an exploded elevational view of the axle 20, showing the spindle 24 separated from the bobbin sections 26, 28. The manner in which the spindle 24 drivably engages the bobbin portion of the axle 20 is clearly shown. The spring-end portion of the axle 20 forms a square lug 22, the securely mount the ratchet wheel 44. The passage 32 smoothly penetrates the bobbin sections 26, 28 so that the cord 12 is afforded unimpeded passage through the axle 20. Depending upon the nature of the cord 12, the bobbin sections 26, 28 can lined with, or fabricated from, a low-friction material, such as that manufactured by the DuPont Company under the registered trademark TEFLON.

Figure 6:
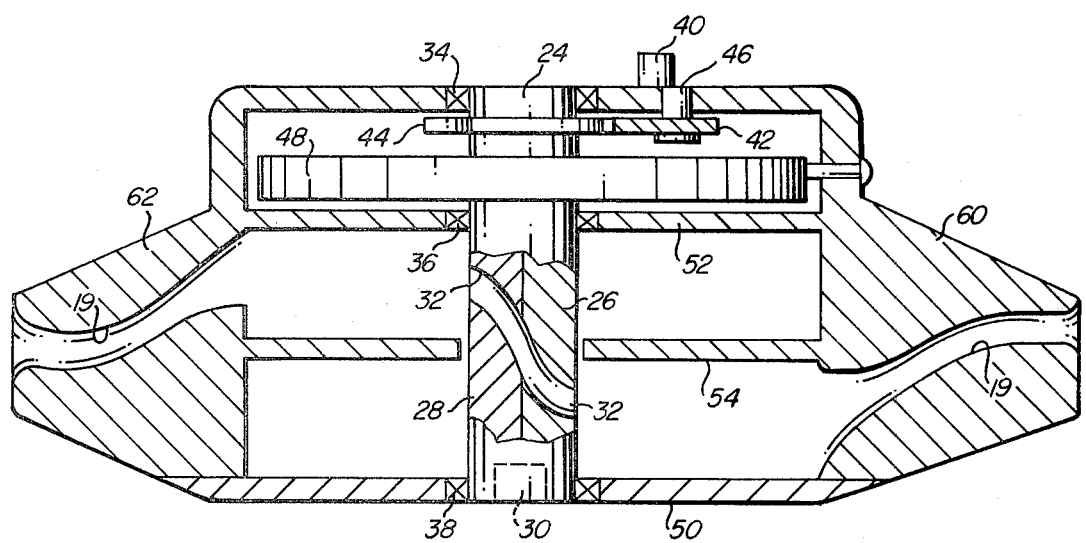
FIG. 6 is a sectional view similar to that of FIG. 4 showing the internal structure of an embodiment of the reel employing cord guides.

In FIG. 6, the reel 10 is shown with integral guides 60, 62 formed into the housing 18. The guides 60, 62 define the respective housing openings 19, 19. The guides 60, 62 align the opposed portions of the cord 12 as they exit from the housing 18, and thus maintain an axial alignment of the cord-imposed forces acting upon the reel 10. This, in turn, tends to maintain the axle 20 in a perpendicular relationship with respect to the opposed portions of the cord 12. The guides 60, 62 are also advantageously lined with, or fabricated from, a low-friction material, to minimize the resistance to the travel of the cord therethrough.

In operation, the reel 10 is initially place upon the cord 12, by passing the cord through the housing openings 19, 19 and through the axle passage 32. The endplate 50 is removed to permit the cord 12 to be threaded through the axle passage 32, and both housing openings 19, 19. The cord 12 initially installed with the spring 48 causes the axle 20 to rotate, and thereby spools the cord 12 about the spaced-apart regions on the bobbin-section of the axle 20. The preferred relationship between the length of cord 12 to be spooled, the size of the housing 18 and the degree of rotation imparted by the spring 48 is preferably such that the entire cord is wound within the housing 18 before the spring is fully unwound. Because the axle 20 collects two wraps of the cord 12 with every revolution of the axls 20, the reel 10 has an advantageously quick retrieve.

When it is desired to unspool the cord 12, one pulls on the opposed ends of the cord 12 to overcome the force of the spring 48, and thereby rotate the axle 20. As the axle 20 rotates, the spring loaded pawl 42 sequentially drops into the teeth of the ratchet wheel 44. Thus, when force is removed from the cord 12, the cord 12 remains extended until the release knob 40 is shifted to release the pawl 42 from the ratchet wheel 44.

When the cord 12 is fully unspooled from the axle 20, the entire reel 10 can be traversed in either direction along the cord 12. This is of distinct value where supporting the reel 10 at a central region of the cord 12, or even the presence of the reel itself, would be objectionable. The reel 10 can be slid to one end, or the other, of the cord 12 to eliminate such interference. It can also be appreciated that the reel 10 provides a cord reel which can be used on a cord 12 without regard to the character of the fittings or devices attached to the respective ends of the cord 12. Thus, the reel 10 can be used with an electrical or fluid conducting cord 12, without any requirement for a rotary fitting to facilitate the conduction of the energy or fluid.

While the invention has been particularly described and shown in reference to the preferred embodiments thereof, it will be understood by those skilled in the art that various changes in form and detail and omissions may be made therein without departing from the spirit and scope of the invention. For example, the electrical type cord 12 is threaded through the opening 19 before either the selected appliance (at one end) or the plug (at the other end) is connected to the cord 12.

What is claimed is:

1. A floating cord reel for storing cord, comprising:
a sectioned axle having a spindle section and a bobbin section and defining an aperture lying generally in a diametrical plane of said bobbin section of said axle, said bobbin section removeably engaging said spindle section to facilitate threading said cord through said aperture;

housing means having said axle rotatably mounted therein for maintaining said cord in general perpendicularity with respect to said axle as said cord approaches said bobbin section of said axle, said housing means including a removeable end plate to allow said bobbin section to be disengaged from said spindle section; and rotating means engaging said spindle section of said axle for selectively rotating said axle to spool said cord about said bobbin section of said axle and further for permitting said cord to be selectively unspooled from said bobbin section of said axle.

2. A floating cord reel in accord with claim 1, wherein said axle defines the respective openings of said aperture at axially spaced regions of said bobbin section of said axle so that a single revolution of said axle spools two wraps of said cord around said bobbin section of said axle.

3. A floating cord reel in accord with claim 2, wherein said housing means includes guide means aligned between said respective openings for aligning opposed portions of said cord in substantial perpendicularity with respect to said axle as said opposed portions of said cord enter and exit said housing means; said guide means maintaining an axial alignment of said opposed cord portions with said axle.

4. A floating cord reel in accord with claim 3 wherein said housing means further comprises:

a housing disposed about said axle and defining a chamber about said bobbin section of said axle; and baffle means having a baffle coupled to said housing within said chamber and adjoining said axle at a region between said respective axially spaced openings in said bobbin section of said axle for dividing said chamber into two regions for isolating the separate wraps of said opposed portions of said cord spooled about said bobbin section of said axle when said axle rotates.

5. A floating cord reel in accord with claim 4 wherein said rotating means comprises:

spring means having a spring coupled to said spindle section of said axle and to said housing for rotating said axle to spool said opposed portions of said cord about said bobbin section of said axle;

a ratchet wheel coupled to said spindle section of said axle; and pawl means having a pawl pivotally coupled to said housing and disposed to engage said ratchet wheel for releasably precluding said spring means from spooling said opposed portions of said cord about said bobbin section of said axle.

6. A method for compactly storing cord in a floating cord reel having a housing and a sectioned axle rotatably mounted therein comprising the steps of:

removing an end plate of said housing to expose a removeable bobbin section of said axle;

disengaging said bobbin section of said axle from a spindle section of said axle;

threading said cord through a first apertured guide in said housing, through a diametrical aperture in said disengaged bobbin section of said axle, and through a second apertured guide in said housing;

re-engaging said bobbin section of said axle with said spindle section of said axle;

replacing said end plate of said housing in position upon said housing to rotatably lock said bobbin section of said axle in position and to enclose a spooling chamber within said housing;

sliding said housing along the length of said cord to a desired location along said cord; and spooling two wraps of said cord about said bobbin section of said axle for each revolution of said axle.

* * * * *